United States Patent [19]

Rupp et al.

[11] Patent Number: 5,347,468
[45] Date of Patent: Sep. 13, 1994

[54] COMPUTERIZED GRAIN DELIVERY SYSTEM

[75] Inventors: Steven J. Rupp, Minnetonka; Larry C. McNeff, Hopkins; Clayton V. McNeff, Minneapolis, all of Minn.

[73] Assignee: SarTec Corporation, Anoka, Minn.

[21] Appl. No.: 955,468

[22] Filed: Oct. 2, 1992

[51] Int. Cl.$^5$ ............................................. A23N 17/00
[52] U.S. Cl. .................................... 364/510; 364/469; 426/231
[58] Field of Search ........................ 364/510, 469, 502; 99/487, 488, 516, 536; 426/231

[56] References Cited

U.S. PATENT DOCUMENTS

| | | | |
|---|---|---|---|
| 3,732,435 | 5/1973 | Strandberg, Jr. et al. | 307/118 |
| 3,744,144 | 7/1973 | Weis | 34/16.5 |
| 4,386,471 | 6/1983 | Bowrey et al. | 34/26 |
| 4,499,111 | 2/1985 | Oetiker et al. | 426/231 |
| 4,558,523 | 12/1985 | Isbell et al. | 34/30 |
| 4,630,489 | 12/1986 | Fisher et al. | 73/861.87 |
| 4,644,665 | 2/1987 | Naunapper et al. | 34/26 |
| 4,696,115 | 9/1987 | Spadafora | 34/43 |
| 4,748,400 | 5/1988 | Typpo | 324/61 R |
| 4,898,092 | 2/1990 | Greer | 99/487 |
| 4,993,316 | 2/1991 | Greer | 99/487 |
| 4,994,286 | 2/1991 | Greer | 426/231 |
| 5,133,982 | 7/1992 | Bodkin et al. | 426/231 |
| 5,139,779 | 8/1992 | McNeff | 424/195.1 |
| 5,194,275 | 3/1993 | Greer | 426/231 |

OTHER PUBLICATIONS

"Automatic Control of Wheat Conditioning," J. Butcher, *Milling*, vol. 152(6), 1970.
"Cetec TEMPERTRON," Cereal Technologies, Inc. Mar., 1990.
"H₂O-KAY, The World's Most Advanced Grain Tempering System," Henry Simon Ltd, Cheshire, England Mar., 1990.
"Wheat Tempering, Moisture Measurement and Control," published by Kay-Ray, Inc., Arlington, Illinois Mar. 1990.
"ACCU-SENSE, On-Line Non-Contacting Moisture Measurement System," published in 1982 by Kay-Ray, Inc., Arlington, Illinois.
"The Boonton Milltrol System," *Moisture Bulletin*, Boonton Polytechnic Co., vol. 1, No. 5, Aug. 1964.
Dickey-john brochures Jun., 1983.
"Moisture in Grain," Foss America, Inc. Apr., 1991.
"APAC III Systems and Flour Mills," Agridustrial Electronics, Inc., Battendorf, Iowa, Apr. 15, 1976.
Brochure, ACECO Automatic Control Electronics Dec., 1983.

*Primary Examiner*—Thomas G. Black
*Assistant Examiner*—Michael Zanelli
*Attorney, Agent, or Firm*—Merchant, Gould, Smith, Edell, Welter & Schmidt

[57] ABSTRACT

A method and apparatus for controlling the addition of a liquid to a continuous flow of material. An algorithm is described for controlling the hydration process within a computerized grain delivery system. The grain delivery system operates by adding moisture to grain moving through the system, testing the moisture level of the hydrated grain and controlling the rate of flow of the wetting agent as a function of the wet grain moisture reading. In addition, a method is described for determining the relationship between dry grain moisture level, hydration level and the expected wet grain moisture level reading. Finally, a communications link is described which connects the grain delivery system to a remote computer.

19 Claims, 7 Drawing Sheets

COMPUTERIZED GRAIN DELIVERY SYSTEM

BACKGROUND OF THE INVENTION

Field of the Invention

The present invention relates to methods and apparatus for increasing the moisture level of a material (in grain this is termed conditioning or tempering), and more particularly to methods and apparatus for adding a liquid to a continuous flow of grain in order to raise its moisture level to a level approximating a target moisture level.

Background Information

Moisture control has always been a factor in milling. Grain purchased from a number of suppliers may have moisture content varying anywhere from 10 to 20 percent of its body weight. In flour milling, such variation in moisture can result in mill chokes or inferior or off-color product. In feed milling, such variation can result in waste due to brittle or improperly conditioned feed. Since the typical mill can process several hundred tons of grain every day, a mill may see fairly rapid swings over a relatively short time in the moisture level of grain being processed.

To counteract this problem and in order to provide a mill with grain having a more uniform moisture level, grain conditioning systems have been proposed for tempering the grain before it is processed in order to increase its moisture level. A grain conditioning system adds a liquid to the grain as it is loaded into a grain elevator or as it flows into the mill. Typically, grain conditioning systems determined the amount of liquid to be added by measuring the dry (unconditioned) grain, the wet (conditioned) grain, or both dry and wet grain. Systems in which the amount of water added to the grain is determined by measurements of the moisture level of the dry grain are termed feedforward systems. Systems in which the amount of water added is determined not from the dry grain but from the moisture level of already conditioned grain are termed feedback systems. In practice, tempering has been shown to reduce mill stoppages and chokes due to fluctuating mill balance and to improve both the efficiency of the milling process and the quality of the end product.

Besides the grain milling industry, other industries can benefit from an efficient conditioning process. For instance, in coffee roasting it is important to raise green coffee beans to a uniform moisture level in order to ensure a consistent roast. In paper mills, wood chips kept at a consistent moisture level shred more efficiently within paper mill digesters. Similarly, in cement products, correct moisture level is important for proper mix ratios.

A feedforward system for controlling liquid added to a material such as feed grain during the conditioning process is taught generally by Greet (U.S. Pat. No. 4,898,092). Greer discloses a feed grain delivery system in which dry grain readings are used to control the amount of moisture added to feed grain in order to raise the moisture content to a relatively constant target level. A further patent issued to Greer (U.S. Pat. No. 4,993,316) discloses a similar apparatus for use in increasing the moisture content of seed grain prior to planting.

Since conditioning systems based solely on dry material readings do not measure moisture content in the conditioned product, such feedforward systems are susceptible to variations in the conditioning process due to temperature and changes in water pressure. These systems are unable to determine what, if any, effect the conditioning process is having on the material being conditioned and, therefore, cannot adapt to changing conditions.

A feedback system for controlling liquid added to grain during the conditioning process is taught generally in Strandberg, Jr. et al. (U.S. Pat. No. 3,732,435). Strandberg teaches the placement of a moisture sensor at the output of the moisture conditioner. The rate at which water is added to or removed from the material is controlled by varying the speed at which the material is exposed to a constant flow of moisture or drying air. In a second type of feedback system, a controller is used to adjust the amount of water added to a grain in order to bring the moisture level of the conditioned grain to approximately the target moisture level.

Since, however, feedback systems do not track the moisture level of incoming (dry) grain, they can be confused when wet grain moisture level readings vary due to changes in the dry grain moisture level. In addition, the ability of feedback systems to track the target moisture level is compromised by the unstable electrical characteristics of many materials immediately after the addition of water. This instability becomes more apparent as the level of hydration increases and makes it difficult to accurately measure moisture level in recently hydrated material. For these reasons, manufacturers typically will restrict a feedback system to use with products which absorb and stabilize moisture rapidly (such as soybean meal and millfeed).

A combination feedforward/feedback system is described in an article entitled "Automatic Control of Wheat Conditioning" published by J. Butcher in *Milling*, Vol. 152(6) in 1970. In the article Butcher teaches the use of both wet and dry grain moisture sensors in controlling the amount of water to be added during grain conditioning. Such an approach solves many of the problems of purely feedforward and feedback systems but at the price of increased cost and reduced reliability.

It is apparent that feedback controlled grain conditioning systems, since they operate on the basis of the finished product, should be best capable of reacting to and compensating for changes in grain and water flow conditions. These systems, however, have been limited by their inability to adapt to changes in dry grain moisture levels. What is needed is an improved, self-calibrating, feedback controlled system for measuring and correcting the application of moisture to a material to raise it to a moisture level which approximates a desired moisture level.

SUMMARY OF THE INVENTION

The present invention provides a method and apparatus for controlling the addition of a liquid to a continuous flow of material. Grain delivery system is described which operates by adding moisture to grain moving through the system, testing the moisture level of the hydrated grain and controlling the rate of flow of the wetting agent as a function of the wet grain moisture reading. An algorithm is described for controlling the amount of water added during the hydration process and for compensating for fluctuations both in water supply pressure and in the moisture levels within the incoming unconditioned material.

In another aspect of the current invention, a method is described for determining the relationship between dry grain moisture level, hydration level and the expected wet grain moisture level reading. The method can be used to adapt the feedback control method to a variety of applications which would benefit by the use of materials raised to a uniform moisture level.

In yet another aspect of the current invention, a communications link is described which connects the grain delivery system to a remote computer. The communications link can be used to transmit status regarding the current operation of the grain delivery system or for downloading commands or new program code affecting operation of the grain delivery system.

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

The present invention provides a method and apparatus for conditioning a continuous flow of material such as grain as it is conveyed past a source of a wetting agent such as water. It should be apparent that, although the invention is described in terms of the grain conditioning application, the technique can be easily and advantageously adapted to applications such as the roasting of coffee beans or the preparation of wood chips for pulping. In addition, liquids other than water could be used in such a system.

Figure 1:
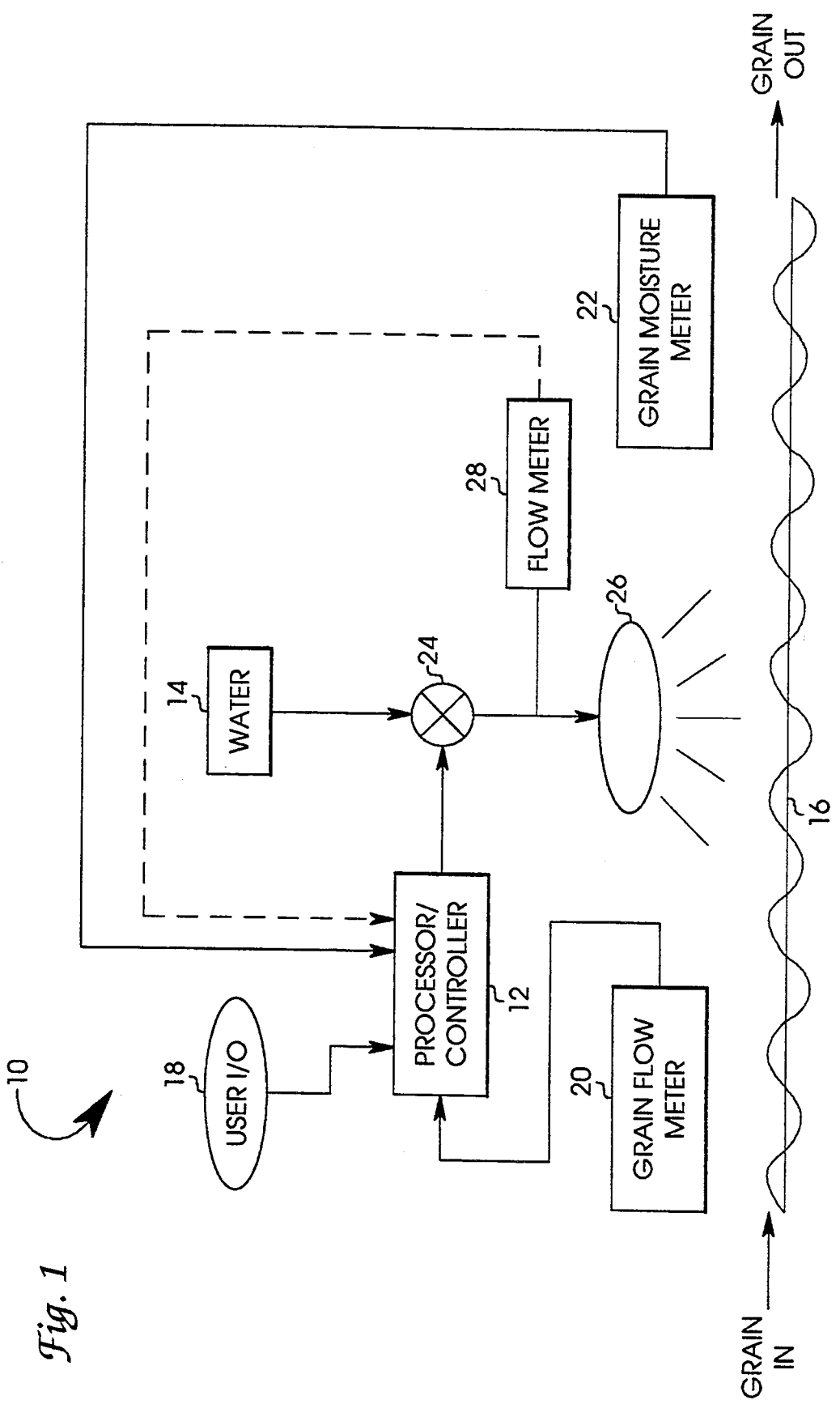
FIG. 1 is a system level block diagram representative of a computerized grain delivery system according to the present invention.

A system level block diagram representative of a grain conditioning system 10 is shown generally in FIG. 1. System 10 is a feedback system in which a processor 12 controls the transfer of water from a water source 14 to grain being carried on a material conveying means 16. Processor 12 is connected to a user interface 18, a grain flow meter 20, a grain moisture meter 22 and a flow control valve 24. In system 10, grain flow meter 20 measures the flow of grain while grain moisture meter 22 measures the moisture level of the conditioned grain. Processor or controller 12 increases or decreases water going through valve 24 in response to the grain flow and moisture level measurements. Water flows from water source 14 through flow control valve 24 to a water distributing system 26 such as a sprinkler head. In one embodiment, a flowmeter 28 is used to monitor the amount of fluid flowing to water distributing system 26. A flowmeter is useful for gauging the operation of valve 24. In addition, if the flowmeter is connected to processor 12 the flow rate measured by the flowmeter can be used for feedback control of valve 24.

In the typical grain delivery system, material conveying means 16 is an auger which carries grain past a sprinkler head 26. Grain moisture meter 22 is located either within the auger itself or within a funnel placed at the end of the auger. As might be expected, since absorption rate is a function of mixing time, placement of moisture meter 22 is critical for reliable operation. In the embodiment shown in FIG. 1, moisture meter 22 is placed approximately 30 seconds downstream from sprinkler head 26 based on the grain flow rate. In practice, the placement of moisture meter 22 within the auger has tended to produce better results than an equivalent placement in a funnel at the end of the auger.

Figure 4:
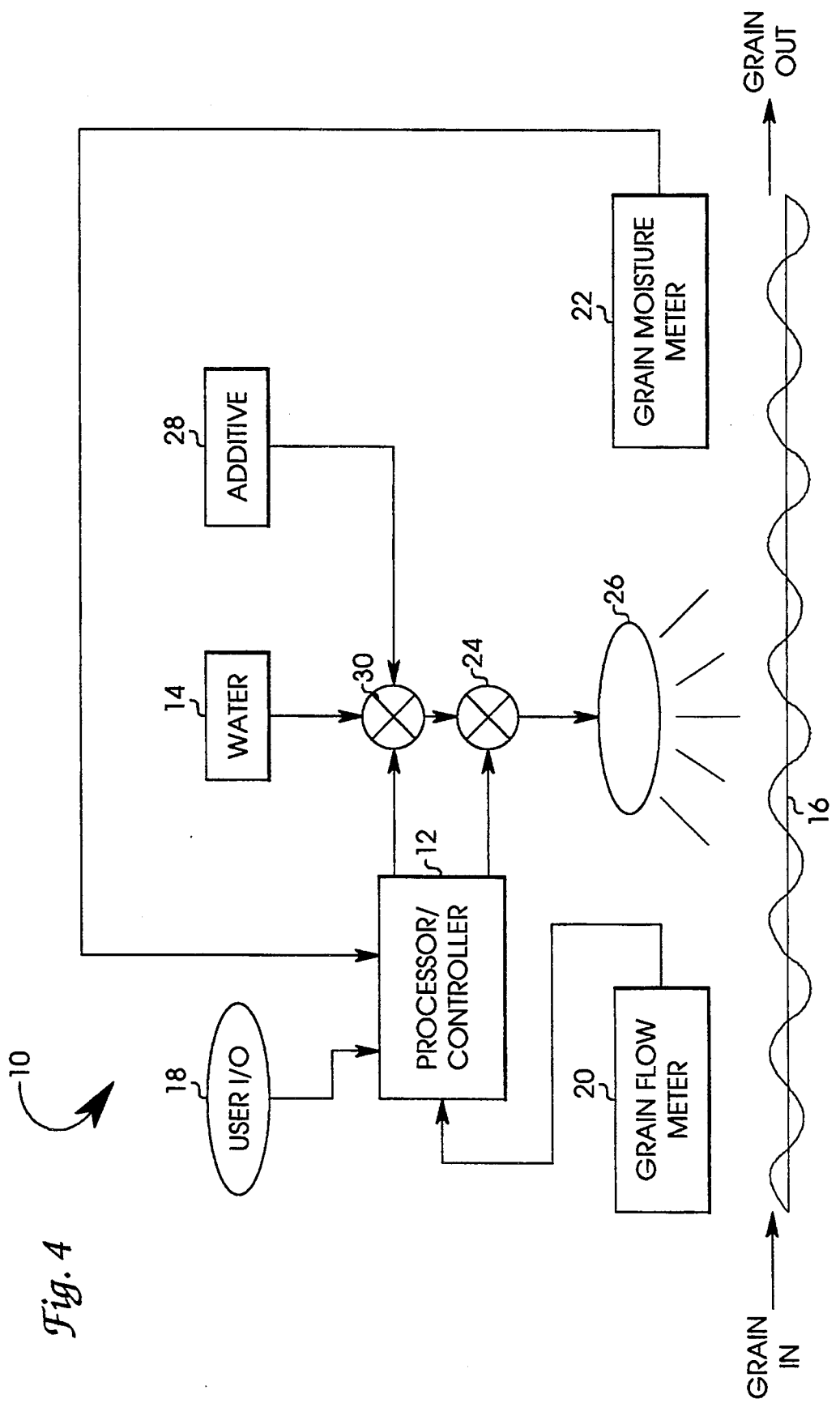
FIG. 4 is a system level block diagram representative of a computerized grain delivery system with additive injection capability.

An alternate embodiment of the present invention is shown generally in FIG. 4. In the embodiment shown in FIG. 4, the system 10 of FIG. 1 also comprises a mixing valve 30 which operates under the control of processor 12 to regulate the mixing of an additive to water from water supply 14. In the preferred embodiment, a chemical pump (not shown) is used to meter a constant amount of additive to valve 30. The additive may be a sarsasaponin-based liquid. Such liquids are used to reduce the surface tension of the water on the grain kernel, permitting easier penetration of the kernel and, therefore, faster absorption. The sarsasaponin-based additive also provides some nutrient benefits for ruminants. A method of tempering feed grain by applying to the grain a conditioning composition such as a sarsasaponin is disclosed in commonly owned U.S. Pat. No. 5,139,779, issued Aug. 18, 1992, to McNeff, the entire disclosure of which is incorporated herein by reference.

Processor 12 uses what can be called a heuristic approach to calculate dry grain moisture levels based on wet grain readings. Experimental data relating wet grain readings and hydration levels to expected dry grain readings has been compiled for corn and can be seen in the graph shown in FIG. 2. Once system 10 has been calibrated, processor 12 is able to calculate the current dry grain moisture level solely from the wet grain moisture level reading and the hydration level chosen. New hydration levels can then be selected in order to bring the moisture level in the grain to a level approximating the target moisture level.

Figure 2:
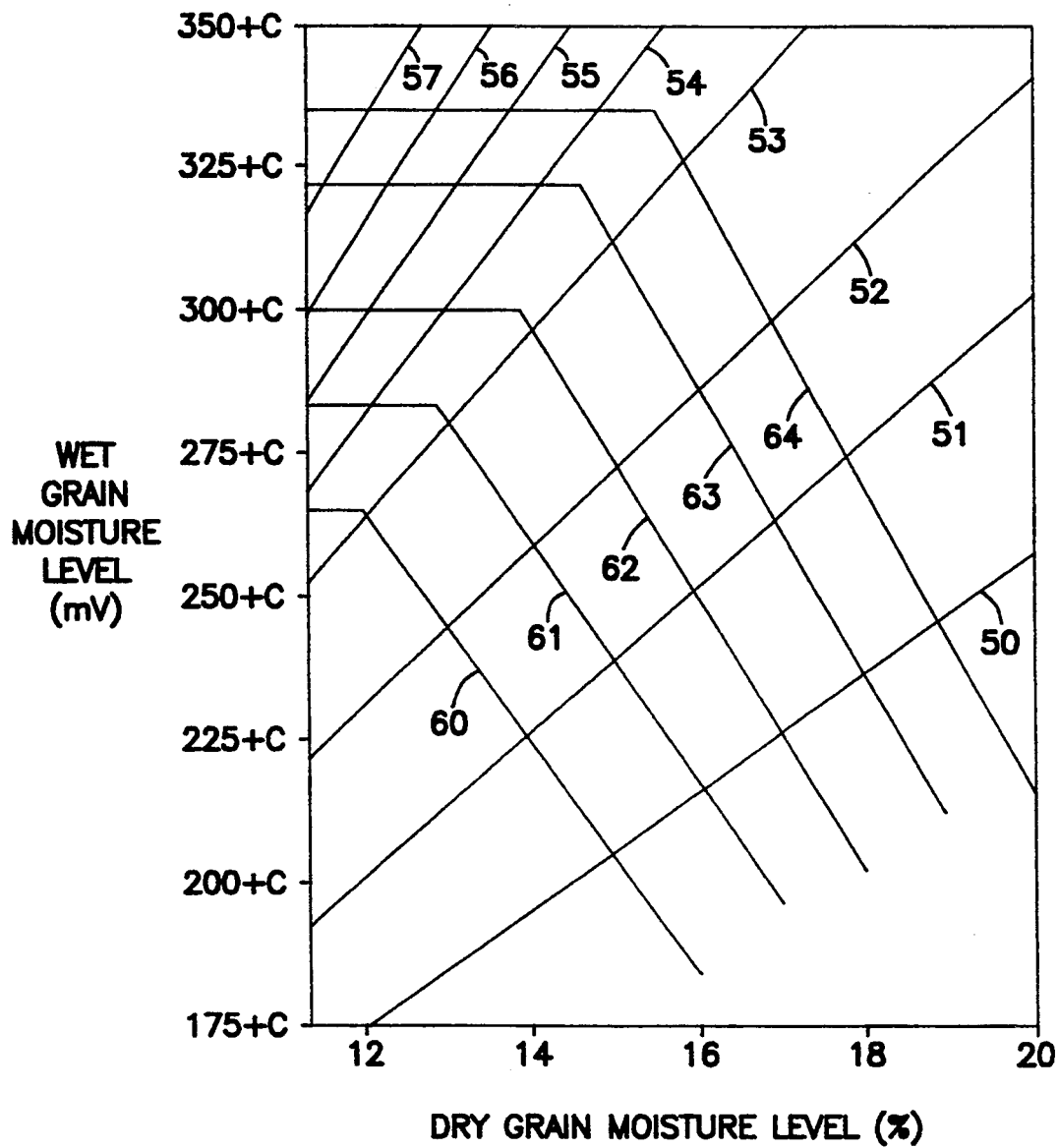
FIG. 2 is a graphical representation of the relationship between wet and dry grain moisture level measurements for certain hydration levels.

The graph of FIG. 2 illustrates the relationship between wet grain moisture level, dry grain moisture level and hydration level for a grain such as corn. Lines 50-57 show how wet grain moisture measurements change as a function of the dry grain moisture level for constant hydration levels of 1–8%, respectively. Lines 50–57 relate wet grain moisture level to dry grain moisture level as follows:

Hydration level=1%, $Y=10*X+57+C$;

Hydration level=2%, $Y=12*X+60+C$;

Hydration level=3%, $Y=13*X+77+C$;

Hydration level=4%, $Y=14*X+97+C$;

Hydration level=5%, $Y=17*X+80+C$;

Hydration level=6%, $Y=19*X+75+C$;

Hydration level=7%, $Y=19*X+90+C$;

Hydration level=8%, $Y=19*X+105+C$.

where
    Y = the wet grain measurement (in mV) (max reading=335 mV);
    X = the initial dry grain reading (%);
    and C = the moisture meter calibration constant.

As can be seen with lines 50-57, the wet grain reading increases linearly for constant hydration level as a function of the dry grain moisture level.

Lines 60-64 have been added to FIG. 2 in order to illustrate how the wet grain moisture level measurement is expected to change as a function of both the dry grain moisture level and the hydration level for a constant target moisture level. Lines 60-64, corresponding to target moisture levels of 16-20%, respectively, were drawn by adding the hydration level to the dry grain moisture level. For example, line 61 was formed by drawing a line through the points obtained by adding 14% (the dry moisture level as shown on the horizontal axis) to 3% (the hydration level shown as line 52) and by adding 16% to 1% (the hydration level shown as line 50).

As can be seen, the wet grain moisture level reading for 14% moisture level dry grain raised to a 17% target moisture level (as shown in the intersection of lines 61 and 52) is different from the wet grain moisture level reading for 15% moisture level dry grain raised to exactly the same target moisture level (intersection of lines 61 and 51). This difference can be attributed to the fact that a grain such as corn has a limited absorption rate. Therefore, the amount of moisture on the surface of the kernel is a function of the absorption rate of the grain, the level of hydration and the amount of mixing time between hydration and the wet grain moisture level measurement. For some time after hydration, grain treated at a 3% hydration level will have a higher percentage of water on the outside of the kernel than grain treated at a 2% hydration level. Although addition of an additive such as sarsasaponin as described in the McNeff reference incorporated above, can serve to increase the absorption rate, it is not possible to completely absorb the added moisture before the wet grain moisture measurement. The presence of this moisture on the outside of the kernel leads to an inflated moisture reading and eventually, at higher hydration level, blinds the moisture meter, making measurement uncertain (shown in the constant level lines in lines 60-64). In most cases, however, that threshold hydration level exceeds any practical water level that would be used. Eventually, 14% grain treated at a 3% hydration level will settle at approximately the same moisture level as 15% moisture level grain treated at a 2% hydration level.

In practice wet grain moisture level readings move within a certain deadband traced by the appropriate hydration line on either side of the desired target line. Typically, this deadband is set fairly wide in order to reduce the number of times the hydration level must be changed. In one embodiment, a deadband of ±0.5% on either side of the target moisture level has proven to be appropriate.

It should be obvious that one can compile a graph such as that shown in FIG. 2 for any material which is to be conditioned. Compilation of such a graph would require the collection of a statistically significant series of measurements, at predetermined hydration levels, of known dry material at a variety of dry material moisture levels. The graph of FIG. 2 was created for corn under controlled conditions. In a system such as that shown in FIG. 4, the rate of grain flow was kept fairly constant by holding auger 16 at constant speed and limiting the amount of grain fed to auger 16 via an aperture on the grain bin. Water pressure was controlled such that a particular set point on valve 24 corresponded to a constant flow rate as measured by a flowmeter. Mix time was controlled by controlling the grain flow as described above and by maintaining a minimum mixing time between hydration and the wet grain moisture level measurement. Finally, a chemical pump was used to meter a constant flow of a sarsasaponin additive into the water via valve 30. A liquid form of sarsasaponin sold under the trademark SarTemp by SarTec Corporation of Anoka, Minnesota was used.

Preliminary tests were run in order to determine the time necessary for an adequate amount of water to be absorbed by the grain. These tests showed that 30 seconds was a reasonable amount of time to wait for the water/SarTemp solution to be adequately absorbed by the grain. A thirty second mixing time ensured normal minimal "blinding" of mV readings in the range of 7-8% water addition and guaranteed reasonable resolution between corns of differing dry moisture levels exposed to the same hydration level.

One thousand pounds of corn was run through the apparatus for each trial with each trial lasting approximately 2-2½ minutes. Samples of each batch of corn were used to establish a dry grain reference point for each trial. Next, a constant amount of the water/SarTemp liquid mixture, corresponding to a specific projected hydration level, was added to the grain in each individual trial and a series of wet grain moisture levels were measured by moisture meter 22. These measurements were then averaged to obtain the prevailing mV reading for that trial. The wet samples were also gathered in ziplock bags and allowed to sit overnight before being tested to determine the final moisture level for the trial. For the graph of FIG. 2, these trials were performed on corn with dry grain moisture levels of between 11% and 18% which was tempered to between 16% and 20%. Each trial consisted of approximately 15 data points. In all, about 80 trials were performed (an average of 2 tests for each of the 40 possible combinations).

Once all data were gathered and compiled, regressions were run to obtain the best possible hydration lines with the lowest least squared error. Theory suggested that these lines would be positively sloped due to the proven positive relationship between dry grain moisture level, hydration and mV reading. Given a constant level of water addition, it was expected that a grain with a higher initial moisture level would, following an adequate mix time, display a higher mV reading than a dry grain with a lower initial moisture level. Data later proved this theory to be reliable.

When, however, results of the different trials were pooled together, no absolute numerical trend existed. A wide variation existed across trials although the trials themselves were individually very consistent. That is, using the classical normal linear regression model, $$Y_i = \alpha + \beta X_i + \Sigma_i$$

where $Y_i$ is the prevailing mV reading at the i% hydration level, $X_i$ is the dry grain moisture level before i% hydration, and $\Sigma_i$ is the stochastic disturbance in the model, no acceptable regression parameter fit was found. Although $\beta$ was statistically significant, $\alpha$ was unreliable and $R^2$ did not approach a reasonable level of fit using the least squares estimation technique. Furthermore, the error term was characterized by autocorrelation within tests performed on a specific batch of corn. It seemed obvious that a systematic explanatory variable had been omitted.

Therefore, a second regressor was added to the theoretical regression model to serve as a second explanatory variable. This variable $X_{2i}$ related to the quality of the corn and its ability to absorb moisture given the 30 second mix time No quantitative value could be assigned to this variable, however, as density did not work.

Since the second variable could not be measured but merely counted, it qualified as an attribute or dummy variable. Finally, since there would be no practical way for system 10 to differentiate between different qualities or varieties of corn and the task of accumulating data on each variety would be extremely difficult due to the multitude of corn varieties, the regression model was again modified to include a calibration constant "C". Experimentation showed that C could be generated by feedback from the system and would serve as the best possible coefficient estimate for the applicable dummy variable at the time of sampling. To do this, an assumption was made that corn quality remained constant throughout the course of an individual run. Using this theory our regression equation for each individual hydration level became:

$$Y_i = \alpha + \beta X_i + C + \Sigma_i$$

where C was the calibration coefficient.

The series of tests showed that the slope of each of the hydration levels is fairly constant over a variety of corn types and conditions. Therefore the constants $\alpha$ and C were significant factors in determining the location of the hydration lines. Unfortunately, since C could not be considered a stationary constant in this application, there was no apparent way to estimate it. Furthermore, $\alpha$ and C could not be simultaneously estimated because they could not be statistically differentiated. Finally, it was determined that the best way to include C into the algorithm was to use it to offset the intercept coefficient within each individual corn run. Pooling all of the data and applying this technique increased the reliability of the estimates considerably. $R^2$, a measure of goodness of fit, increased to an acceptable level. More importantly, both $\alpha$ and $\beta$ became significant as demonstrated by t-statistics which easily disproved the null hypotheses:

$$H_0: \alpha = 0 \text{ and } H_0: \beta = 0$$

respectively We adopted such a model as the best estimate of this relationship.

Calibration constant C is also useful as a natural calibration offset. Since C is measured at the start of each run, it automatically compensates for electronically induced signal drift within moisture meter 22. Furthermore, it has been shown through field tests that the calibration coefficient can be used to compensate in situations where the normal 30 second mixing time cannot be achieved.

In use, at the start of the hydration process the system is calibrated in order to obtain a value for C (the moisture meter calibration constant). First, an initial dry grain moisture level is measured and a hydration level selected that should produce the desired wet grain moisture level. After the system stabilizes, the moisture level of the moistened grain is measured and saved as the initial wet grain moisture level. C is then calculated and stored for future reference. Grain continues to be hydrated at the initial hydration level until future wet grain moisture readings fall outside of a measurement window or deadband. At that point, the system assumes that the moisture level of the incoming grain has changed, calculates a new dry grain moisture level from the current hydration level and wet grain moisture level and sets the new hydration level accordingly.

Figure 3A:
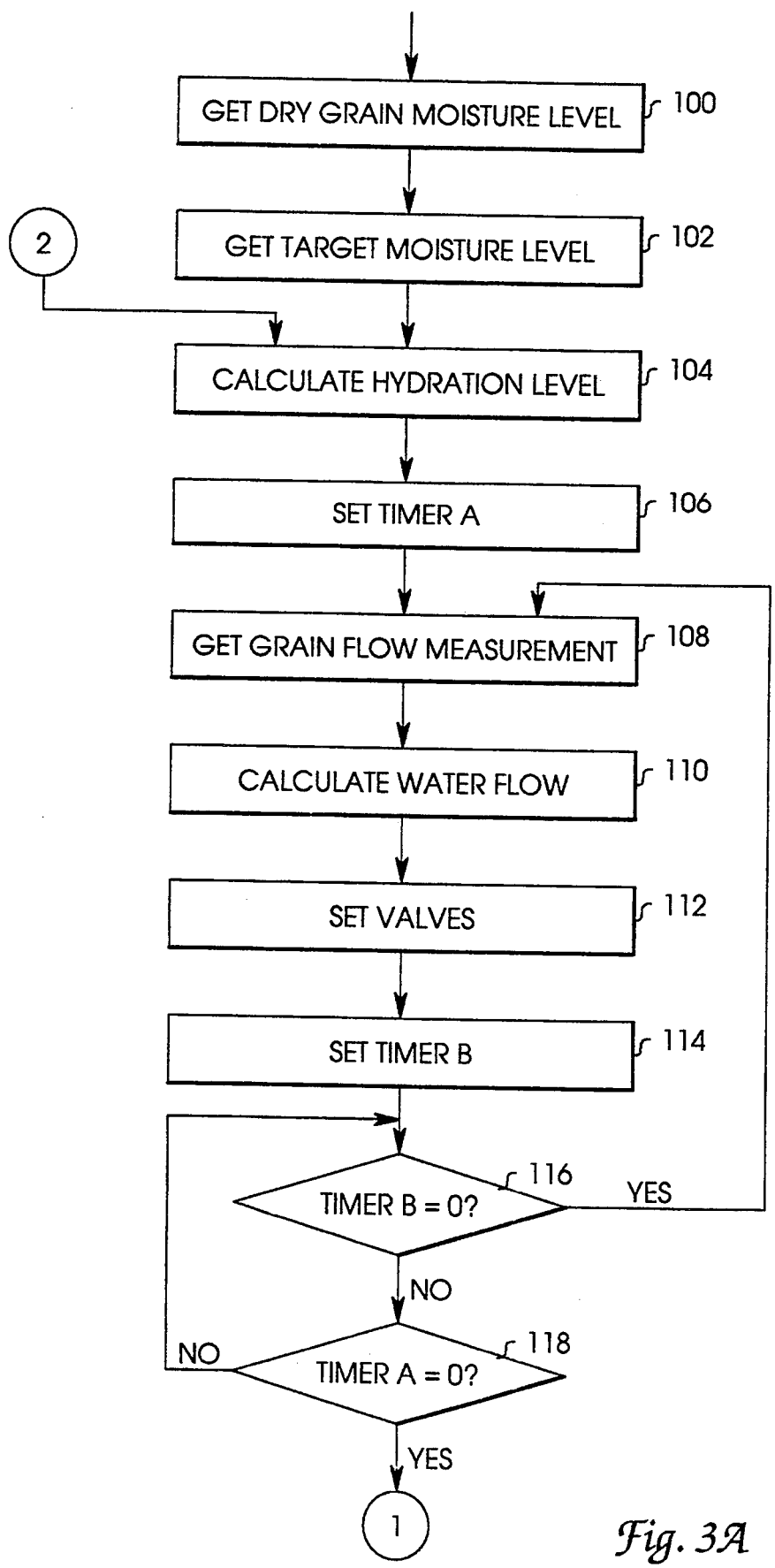
FIGS. 3a and 3b are flow diagram representations of the steps taken in controlling the amount of fluid added within a feedback control system according to the present invention.
Figure 3B:
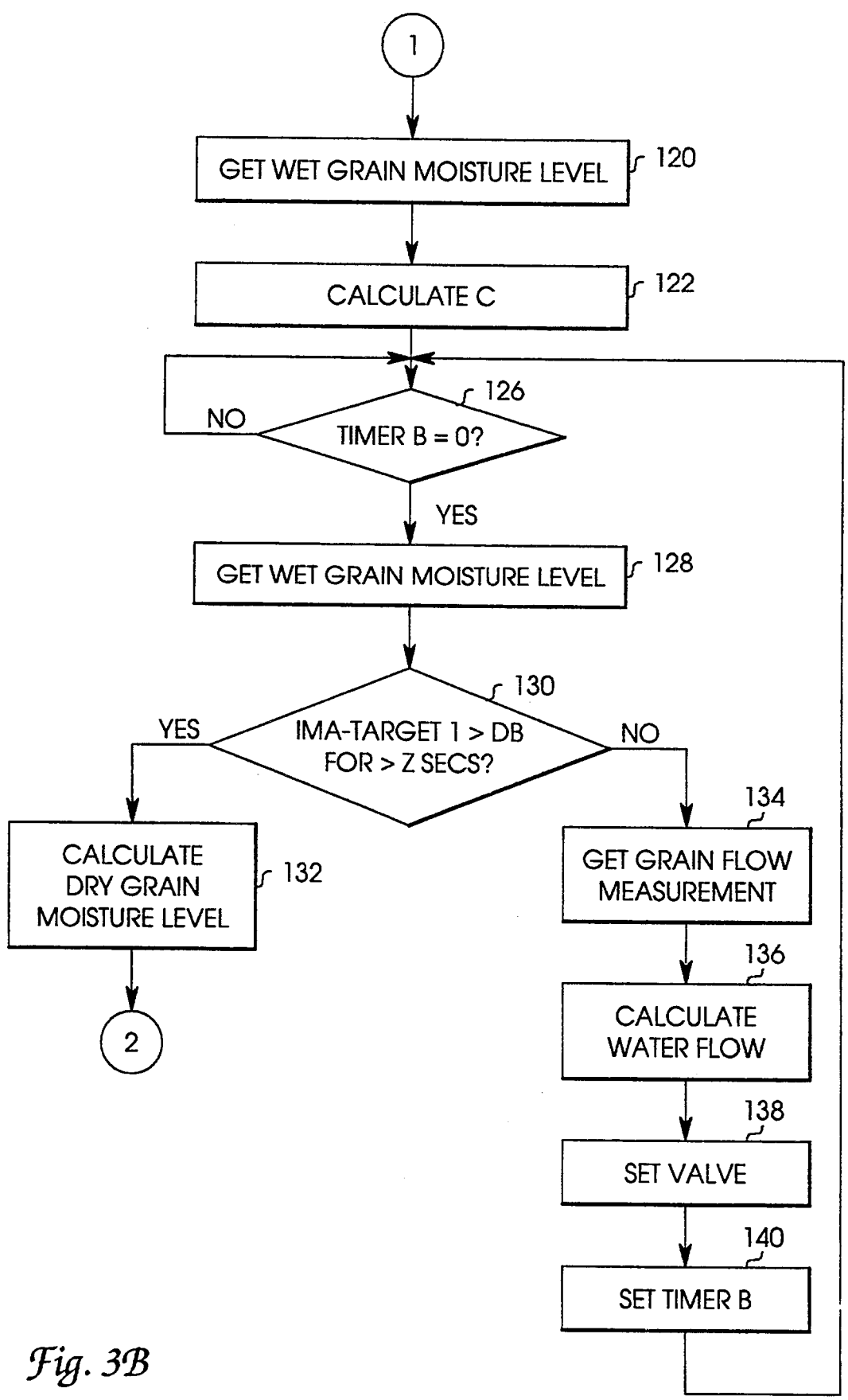

FIGS. 3a and 3b are flow diagram representations of the steps taken in controlling the amount of fluid added to a continuous flow of material within a system such as system 10. As described above, before starting the conditioning process a dry grain moisture level is obtained either by running grain through the system or by other moisture sensing means. At 100, an initial dry grain moisture level is entered into processor 12 based on the above measurement. At 102, a target moisture level is entered into processor 12 via user interface 18 or read from storage means within processor 12. At 104, a hydration level is calculated as the difference between the target moisture level and the initial dry grain reading. At 106, a first timer, Timer A, is set. (The time entered into Timer A is the time the system will wait after a change in hydration level before sampling the resulting wet grain moisture level. This is a system settling time related to the time needed for grain to reach equilibrium at moisture meter 22. The setting time is typically set to between 30 and 60 seconds; it should be set to a time at least 15 seconds greater than the time it takes the treated grain to travel from the hydration point to grain moisture sensor 22.) At 108, an initial grain flow measurement is taken. From the initial hydration level, the initial grain flow measurement and the target moisture level, processor 12, at 110, calculates an initial hydration rate (in gallons/minute (GPM)) as:

$$GPM = \frac{\text{(Initial Grain Flow Rate)} * \text{(Hydration Level(\%)/100)}}{(8.34)(1 - \text{Target Level(\%)/100})}$$

At 112, the hydration rate calculated at 110 is used to set valve 24 to the desired water flow and, at 114, a second timer, Timer B, is set. (Timer B is used to respond to fluctuations in the grain flow, the dry grain moisture level and the water flow. A typical time loaded into Timer B is one second. This provides one sample of the grain flow measurement and the wet grain measurement every second.)

Processor 12 then enters a loop in which it checks for either Timer A or Timer B to expire. If, at 116, Timer B has expired (Timer B=0), control moves to 108 and a new grain flow measurement is used to determine if the hydration rate should be changed. In one embodiment of the grain conditioning system of system 10, a water deadband is placed around the current valve setting. Processor 12 will only change valve 24 if the desired setting falls outside the water deadband. This reduces fine movements in valve 24 which can contribute to premature wear. In addition, allowable water offset increase and decrease ranges may be defined. If an allowable water offset increase range is defined and the change to the current valve setting is outside the water deadband but within the allowable water offset increase setting, valve 24 is subjected to a series of fine-tuning pulses (approximately 0.4 seconds pulse width) with a user-selectable off-time (typically set to three seconds) between pulses. If the change to the current valve setting is outside the deadband and outside the allowable water offset increase setting, valve 24 is subjected to a series of coarse-tuning pulses (approximately one second pulse width) with the same off-time. The allowable water offset decrease range operates in a similar manner to select fine-tuning or coarse-tuning pulses as a function of the reduction in water flow.

If, at 116, Timer B is not zero, control moves to 118 where a check is made to see if Timer A has expired. If, at 118, Timer A is not zero, control moves back to 116. If, however, at 118, Timer A does equal zero, control moves to 120 and processor 12 obtains a wet grain moisture level from moisture level meter 24. At 122, the measured wet grain moisture level and the initial dry grain reading is used to calculate a constant C used to remove offsets in moisture level measurements according to the following formula (derived from lines 50–57 of FIG. 2 as described previously):

If the hydration level=1%, then $C = Y - 10*X - 57$;

If the hydration level=2%, then $C = Y - 12*X - 60$;

If the hydration level=3%, then $C = Y - 13*X - 77$;

If the hydration level=4%, then $C = Y - 14*X - 97$;

If the hydration level=5%, then $C = Y - 17*X - 80$;

If the hydration level=6%, then $C = Y - 19*X - 75$;

If the hydration level=7%, then $C = Y - 19*X - 90$;

If the hydration level=8%, then $C = Y - 19*X - 105$.

where
Y=the wet grain measurement (in mV) (max reading=335 mV);
X=the initial dry grain reading (%);
and C=the moisture meter calibration constant.
Control then moves to 126 where processor 12 loops on 126 until Timer B has expired.

When Timer B has expired, control moves to 128, where a new wet grain moisture reading is obtained from moisture level meter 22. The new wet grain moisture level is then compared to the expected wet grain moisture level. If, at 130, the difference between the expected level (in mV as obtained from FIG. 2) and a moving average of the wet grain moisture readings exceeds a certain equation deadband for a predetermined period of time, control moves to 132, a new dry grain moisture level is calculated and control moves to 104 for selection of a new hydration level. In typical applications the moving average is calculated by averaging the last ten wet grain moisture level readings. In one embodiment, the moving average would have to be outside the equation deadband for 30 seconds before a change would be made. Also, as stated previously, an equation deadband of $\pm\frac{1}{2}\%$ is usually adequate. In a system with large fluctuations in water pressure, however, a larger deadband may be needed or it might be desirable to require that the moving average be outside the equation deadband for up to 60 seconds. Such a system would be less sensitive to short term variations in water pressure or grain flow.

If the moving average calculated at 130 either has not exceeded the deadband or has not exceeded the deadband for the predetermined period of time, control moves to 134 and a new grain flow measurement is obtained from grain flow meter 20. Control then moves to 136 where a new hydration level is selected based on the grain flow measurement and on to 138 where valve 24 is set to provide the selected hydration level. Control then moves to 140 where Timer B is again set to the period of time between wet grain moisture level measurements and then on to 126.

Once the constant C has been determined, changes in the wet grain moisture level will be treated as due to changes in the dry grain moisture level. For example, given an initial dry grain reading of 14% and a target moisture level of 16%, the initial hydration level calculated at 104 would be (16%–14%) or 2%. Processor 12 would, at 110, use the grain flow measurement taken at 108 and the hydration level calculated at 104 to calculate the water flow necessary to provide that hydration level. Valve 24 would be set accordingly.

After the system settling time set in Timer A has expired, processor 10 would obtain a wet grain moisture level reading from grain moisture meter 22. If, for example, the wet grain reading was 300 mV, processor 12 would, at 122, calculate C (using a hydration level of 2%) as:

$$C = 300 - 12(14) - 60 = 72 \text{ mV}$$

From that point on, moisture meter 22 would be assumed to have a 72 mV offset and longer range changes in the wet grain reading (as seen by the moving average calculated at 130) would be assumed to be due to changes in the moisture level of the unconditioned or dry grain. For instance, if the moving average calculated at 130 was outside the deadband for greater than the prescribed period and, at 128, a wet grain reading of 313 mV was obtained, at 132 processor 12 would calculate a new dry grain moisture level as follows (still using the hydration level of 2%):

$$X = (313 - 60 - 72)/12 = 15\%$$

Since the new dry grain moisture level is 15% rather than 14%, at 104 processor 12 would calculate a new hydration level of 1% and adjust the water flow at 110 accordingly. The hydration level would then stay at 1% until the moving average calculation at 130 determined a need for a change. (It should be obvious that, although the system has been described as operating in discrete steps of hydration and target moisture level, it would be simple to convert such a system into one operating over a continuous range of hydration and target moisture levels.)

In one embodiment of system 10, processor 12 can be configured to use a default, fixed value for the grain flow measurement normally provided by grain flow meter 20. Such a default value would be useful in systems in which the grain flow measurements provided by meter 20 are thought to be inaccurate or in a simpler system where grain flow meter 20 is replaced with an ON/OFF switch which indicates merely whether grain is or is not moving through the conditioning system.

In another embodiment of system 10, processor 12 can be configured to use a default, fixed value for the initial dry grain moisture level reading. Such a value could be preset within program code resident in processor 12 or could be entered by a user via user interface 18.

In yet another embodiment of system 10, processor 12 can detect, from the grain flow measurement provided by grain flow meter 20, a no flow or low flow condition in material conveying means 16 and reduce the water flow accordingly.

Figure 5:
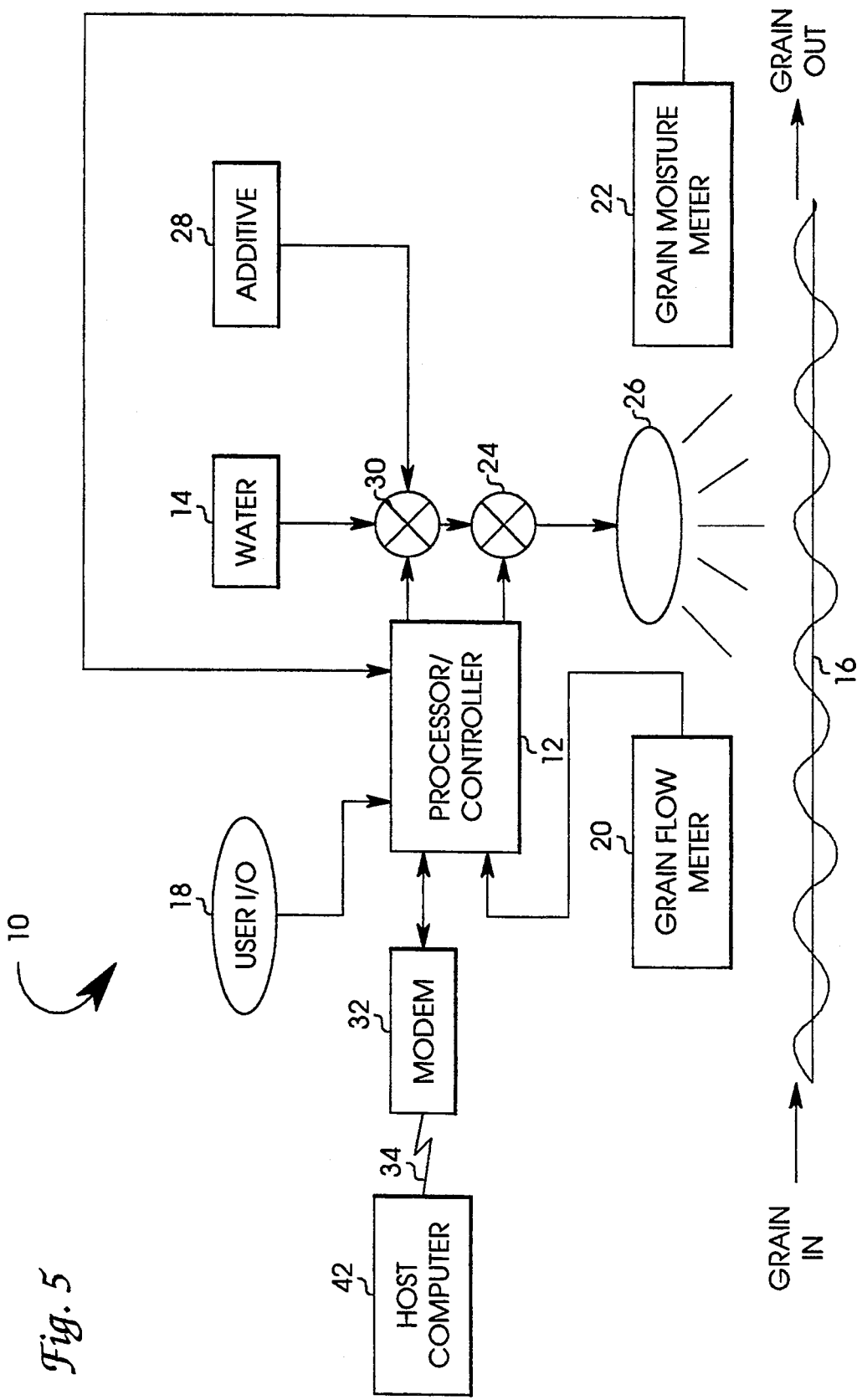
FIG. 5 is a system level block diagram representative of a computerized grain delivery system which can be accessed by a remote computer.
Figure 6:
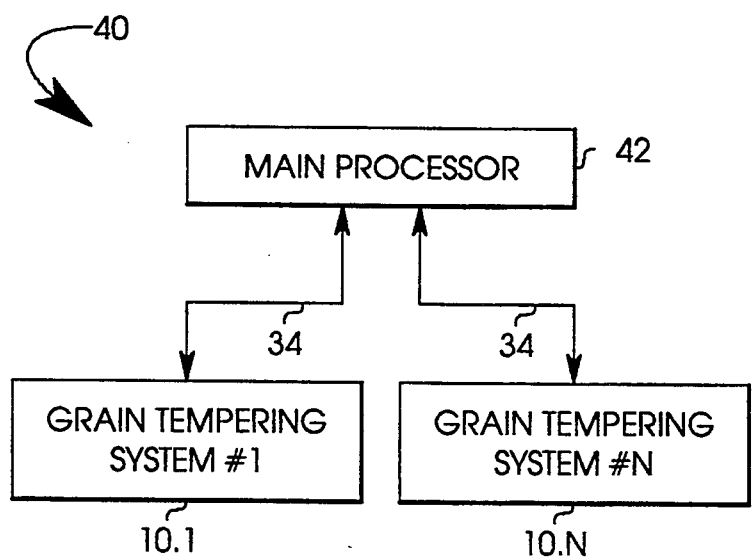
FIG. 6 is a block diagram representative of a network of computerized grain delivery systems connected over communications media to a remote computer.

A second alternate embodiment of the present invention is shown generally in FIG. 5. FIG. 5 is a system level block diagram representative of a computerized grain delivery system which can be accessed by a remote or host computer 42. In the embodiment shown in FIG. 5, the system 10 described in the context of FIG. 4 further comprises a communications means such as a modem 32. Modem 32 operates under the control of processor 12 to communicate over a communications medium such as a common telecommunications line to a host computer 42. FIG. 6 is a block diagram representative of a network 40 of computerized grain delivery systems 10.1 through 10.N connected over communications media 34 to a main processor or remote computer 42.

Addition of modem 32 to the systems of either FIG. 1 or FIG. 4 provides many advantages. First, technicians can access any one grain delivery system 10 via normal telecommunications lines. This provides near instantaneous on-line evaluation and computer diagnostic services. For instance, preliminary diagnostic tests can be run by trained technicians operating from a remote location in order to diagnose hardware and software problems without the expense and inconvenience of a diagnostic visit. Hardware problems can then be resolved within a single maintenance trip. Likewise, software malfunctions can be diagnosed and modifications made without the need for a single trip. Further, software revisions can be made without extensive down time and on-site visits.

In addition to facilitating the servicing of equipment, a grain delivery network such as that shown in FIG. 6 can be used to accommodate electronic data interchange. For instance, the amount of yucca-based additive used can be read by software operating in remote computer 42. System maintenance personnel can use the information gleaned from these product consumption FIGURES to project future use of a product. These projections can then be used to schedule manufacturing of a product and to set appropriate delivery dates. This reduces the amount of product that must be kept on hand by the customer.

Although the present invention has been described with reference to the preferred embodiments, those skilled in the art will recognize that changes may be made in form and detail without departing from the spirit and scope of the invention.

What is claimed is:

1. A method of controlling the addition of liquid to a continuous flow of material, comprising the steps of:
   providing liquid flow control means for controlling flow of the liquid;
   providing an initial dry material moisture level, a target moisture level and a material flow rate;
   calculating, based on the initial dry material moisture level and the material flow rate, an initial liquid flow rate sufficient to raise the material to approximately the target moisture level;
   setting the liquid flow control means to provide liquid at approximately the initial liquid flow rate;
   determining an expected wet material moisture level for the initial liquid flow rate and the dry material moisture level;
   measuring a wet material moisture level;
   determining if the measured wet material moisture level has fallen outside an equation deadband surrounding the expected wet material moisture level measurement; and
   if the wet material moisture level is outside of the deadband, setting the liquid flow control means to a revised liquid flow rate sufficient to condition the material to approximately the target moisture level, wherein the step of setting the liquid flow control means comprises the steps of:
   calculating a revised dry material moisture level based on the initial liquid flow rate and the wet material moisture level;
   calculating the revised liquid flow rate; and
   setting the liquid flow control means to provide liquid at approximately the revised liquid flow rate.

2. The method according to claim 1, wherein the method further comprises providing material flow rate measurement means and the step of calculating the revised liquid flow rate comprises the steps of:
   determining a revised material flow rate; and
   calculating, based on the revised dry material moisture level, the revised material flow rate and the target moisture level, the revised liquid flow rate.

3. The method according to claim 2, wherein the step of measuring a wet material moisture level comprises calculating, based on the initial dry material moisture level and the initial liquid flow rate, a calibration offset which can be used to calibrate the measured wet material moisture level.

4. The method according to claim 2, wherein the step of calculating the revised liquid flow rate comprises the steps of:
   determining if the revised material flow rate is less than a minimum material flow rate; and
   if the revised material flow rate is less than a minimum material flow rate, stopping the flow of the liquid.

5. The method according to claim 1, wherein the step of measuring a wet material moisture level comprises calculating, based on the initial dry material moisture level and the initial liquid flow rate, a calibration offset which can be used to calibrate the measured wet material moisture level.

6. The method according to claim 5, wherein the method further comprises providing liquid flow rate measurement means and the step of calculating the revised liquid flow rate comprises the steps of:
   determining a current liquid flow rate; and
   calculating, based on the revised dry material moisture level, the target moisture level and the current liquid flow rate, the revised liquid flow rate.

7. The method according to claim 5, wherein the method further comprises:
   providing material flow rate measurement means; and
   providing liquid flow rate measurement means; and the step of calculating the revised liquid flow rate comprises the steps of:
- determining a current liquid flow rate;
- determining a revised material flow rate; and
- calculating, based on the revised dry material moisture level, the revised material flow rate, the target moisture level and the current liquid flow rate, the revised liquid flow rate.

8. The method according to claim 7, wherein the step of calculating the revised liquid flow rate comprises the steps of:
- determining if the revised material flow rate is less than a minimum material flow rate; and
- if the revised material flow rate is less than a minimum material flow rate, stopping the flow of the liquid.

9. The method according to claim 1, wherein the method further comprises providing processing means, wherein the steps of setting the liquid flow control means comprise storing in the processing means a liquid flow rate number representative of the liquid flow rate, and wherein the step of calculating a revised dry material moisture level comprises using the liquid flow rate number and the wet material moisture level to calculate in the processing means the revised dry material moisture level.

10. Apparatus for controlling addition of a liquid to a continuous flow of material in order to condition the material to a target moisture level, comprising:
- liquid adding means for adding a liquid to a continuous flow of material;
- liquid control means, connected to the liquid adding means, for restricting liquid flowing to the liquid adding means to a desired liquid flow rate;
- material conveying means for conveying material to be conditioned past the liquid adding means; and
- processing means, connected to the liquid control means, for selecting the desired liquid flow rate, wherein the processing means comprises:
  - a material flow meter which can be used to measure a material flow rate representative of the continuous flow of material;
  - a moisture level meter positioned to sample moisture level in conditioned material;
  - storing means for storing a current liquid flow rate representative of the liquid flowing through the liquid adding means; and
  - flow rate determining means for determining the desired liquid flow rate, wherein the flow rate determining means comprises:
    - programming means for calculating a dry material moisture level based on the current liquid flow rate and the conditioned material moisture level; and
    - programming means for calculating the desired liquid flow rate based on the calculated dry material moisture level and the target moisture level.

11. A computerized grain delivery system for conditioning a continuous flow of grain to a target moisture level, comprising:
- a sprinkler head;
- a fluid control valve connected to the sprinkler head, wherein the fluid control valve is capable of being set to a desired liquid flow rate in order to control flow of a liquid to the sprinkler head;
- an auger positioned to convey grain pass the sprinkler head in order to condition the grain;
- a moisture level meter positioned to determine a conditioned grain moisture level representative of moisture in the conditioned grain; and
- a processor connected to said valve and said moisture level meter, said processor comprising:
  - a user interface which can be used to select the target moisture level;
  - storing means for storing a current liquid flow rate representative of the flow of the liquid through the valve; and
  - control means, connected to such storing means, said valve, said moisture level meter and said user interface, for calculating a dry grain moisture level based on the current liquid flow rate and the conditioned grain moisture level and for calculating a new desired liquid flow rate based on the target moisture level and the calculated dry grain moisture level.

12. The computerized grain delivery system according to claim 11, wherein the computerized grain delivery system further comprises means, connected to the auger, for indicating the flow of grain.

13. The computerized grain delivery system according to claim 12, wherein the means for indicating the flow of grain comprises a grain flow meter.

14. The computerized grain delivery system according to claim 12, wherein the means for indicating the flow of grain comprises a paddle switch.

15. The computerized grain delivery system according to claim 11, wherein the computerized grain delivery system further comprises means, connected to the fluid control valve, for measuring flow of the liquid through the valve.

16. The computerized grain delivery system according to claim 11, wherein the processor further comprises communications means, connected to the control means, for communicating with a remote computer.

17. The computerized grain delivery system according to claim 11, wherein the communications means comprise a modem.

18. A computerized grain delivery system network, comprising:
- a host computer having communication means for communicating with a computerized grain delivery system;
- a computerized grain delivery system placed in a location remote from the host computer, wherein the grain delivery system is for conditioning grain to a target moisture level and wherein the computerized grain delivery system comprises:
  - liquid adding means for adding a liquid to a continuous flow of grain in order to form conditioned grain;
  - liquid control means, connected to the liquid adding means, for restricting liquid flowing to the liquid adding means to a desired liquid flow rate;
  - grain conveying means for conveying grain to be conditioned past the liquid adding means; and
  - processing means, connected to the liquid control means, for selecting the desired liquid flow rate, wherein the processing means comprises:
    - a moisture level meter positioned to measure moisture level in the conditioned grain;
    - storing means for storing a current liquid flow rate representative of the liquid flowing through the liquid adding means;

flow rate determining means for determining the desired liquid flow rate, wherein the flow rate determining means comprises:

means for calculating a dry grain moisture level based on the current liquid flow rate and the conditioned grain moisture level; and means for calculating the desired liquid flow rate based on the calculated dry grain moisture level and the target moisture level; and communication means for communicating with the host computer; and a communications medium connected between the communication means of the host computer and the communication means of the grain delivery system in order to permit communication between the host computer and the grain delivery system.

19. The computerized grain delivery system network according to claim 18, wherein the processing means further comprises a grain flow meter which can be used to measure a grain flow rate representative of the continuous flow of grain.

* * * * *